(12) United States Patent
Turbide

(10) Patent No.: US 10,698,113 B2
(45) Date of Patent: Jun. 30, 2020

(54) THREE-DIMENSIONAL SYNTHETIC APERTURE IMAGING USING SPATIAL AMPLITUDE MODULATION

(71) Applicant: INSTITUT NATIONAL D'OPTIQUE, Québec (CA)

(72) Inventor: Simon Turbide, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 391 days.

(21) Appl. No.: 15/672,949

(22) Filed: Aug. 9, 2017

(65) Prior Publication Data

US 2019/0049588 A1    Feb. 14, 2019

(51) Int. Cl.
*G01S 17/90*    (2020.01)
*G01S 17/08*    (2006.01)

(52) U.S. Cl.
CPC .............. *G01S 17/90* (2020.01); *G01S 17/08* (2013.01)

(58) Field of Classification Search
CPC ........ G01S 13/89; G01S 7/352; G01S 13/931; G01S 7/354; G01S 13/449; G01S 2007/356
See application file for complete search history.

(56) References Cited

U.S. PATENT DOCUMENTS

| | | | |
|---|---|---|---|
| 6,559,932 B1 | 5/2003 | Halmos | |
| 8,842,036 B2 | 9/2014 | Pritt et al. | |
| 9,001,116 B2 | 4/2015 | Ben-David et al. | |
| 9,134,414 B2 | 9/2015 | Bergeron et al. | |
| 2006/0012599 A1* | 1/2006 | Blask | G01S 7/003 345/424 |
| 2011/0273585 A1 | 11/2011 | Stirling-Gallacher | |
| 2012/0229331 A1* | 9/2012 | Bergeron | G01S 13/9005 342/25 C |
| 2016/0084946 A1 | 3/2016 | Turbide | |
| 2017/0031012 A1 | 2/2017 | Hairston et al. | |
| 2018/0224547 A1 | 8/2018 | Crouch et al. | |

OTHER PUBLICATIONS

Chen, C.W. et al., Amplitude-based height-reconstruction techniques for synthetic aperture ladar systems, J. Opt. Soc. Am. A., vol. 22, No. 3, p. 529-538, Mar. 2005.
Richards, Mark A., A Beginners Guide to Interferometric SAR Concepts and Signal Processing, IEEE A&E Systems Magazine, vol. 22, No. 9, Part 2: Tutorials-Richards, p. 5-29, Sep. 2007.

* cited by examiner

*Primary Examiner* — Luke D Ratcliffe
(74) *Attorney, Agent, or Firm* — Merchant & Gould P.C.

(57) ABSTRACT

A method and a system are for three-dimensional (3D) synthetic aperture (SA) imaging. The method and system use spatial modulation on SA return signals as a function of their return angle distribution to account for local topography and provide 3D imaging capabilities. In some implementations, the method can involve a step of generating two spatially modulated two-dimensional (2D) SA images of a target region, each of which having a different spatial modulation profile, and a step of combining the two spatially modulated 2D SA images to obtain a 3D SA image. The 3D SA image can be used to determine an elevation map of the target region.

20 Claims, 10 Drawing Sheets

THREE-DIMENSIONAL SYNTHETIC APERTURE IMAGING USING SPATIAL AMPLITUDE MODULATION

TECHNICAL FIELD

The technical field generally relates to synthetic aperture (SA) imaging and, more particularly, to three-dimensional (3D) SA imaging and associated height reconstruction techniques based on spatial amplitude modulation of return signals.

BACKGROUND

Synthetic aperture (SA) imaging can be used to increase resolution beyond the diffraction limit of a physical aperture of an imaging system. In SA imaging systems, a large "virtual" aperture is synthesized by illuminating a target region with electromagnetic signals transmitted from a moving platform, and by collecting phase-coherent return echoes produced by reflection of the electromagnetic signals from the target region. The return echoes are recorded and combined to reconstruct a high-resolution image of the target region. SA imaging was initially developed and has been employed at radio and microwave frequencies, so that the devices in which SA imaging was first implemented were referred to as "synthetic aperture radar" (SAR). Conventional SAR systems typically operate in the centimeter (cm) wavelength range and produce images with azimuth resolutions of the order of a decimeter (dm) to a meter (m). As resolution generally varies inversely to the imaging wavelength, there has been an interest to extend SAR to shorter wavelengths. In this context, an emerging technology referred to as "synthetic aperture ladar" (SAL) has been developed to extend SAR to the visible and near-infrared regions of the electromagnetic spectrum.

SA imaging systems provide two-dimensional (2D) SA images representing projected ground surface reflectance. A 2D SA image can be represented as a complex-valued array of pixels, so that each pixel has an amplitude value and a phase value. The 2D SA image has an along-track dimension measured in azimuth coordinate and an across-track dimension measured in slant-range coordinate. For a non-flat target region, an ambiguity exists in determining the pair of ground-range and elevation values that corresponds to a measured slant-range value. That is, several combinations of ground-range and height values may lead to a same slant-range value. An approach to remove this ambiguity and enable three-dimensional (3D) imaging is known as "interferometric SA imaging", referred to as IFSAR and IFSAL depending on the operating wavelength. In this technique, two 2D SA images of a target region are acquired from two different viewpoints. The 2D SA images are coco-registered and interfered with each other, and an elevation map of the target region is extracted from their phase difference. A challenge in implementing interferometric SA imaging is that the height reconstruction process involves phase unwrapping, which can suffer from robustness limitations. This is especially true in the case of IFSAL, since the requirements on phase accuracy and platform stability for interferometry tend to become increasingly stringent as the wavelength decreases. Although IFSAL has been demonstrated in laboratory settings, for short target distances and high ground-range resolution, it has yet to be successfully implemented in the field and for low ground-range resolutions. A difficulty encountered with IFSAL is achieving sufficient phase coherence between the two 2D SA images to combine them into a high-quality interferogram. Challenges therefore remain in the field of 3D SA imaging.

SUMMARY

In accordance with an aspect, there is provided a method for synthetic aperture (SA) imaging of a target region from a platform in relative movement with respect to the target region along a travel path, the method including:

illuminating the target region with at least one SA transmission signal transmitted from the platform, and collecting, on the platform, at least one respective SA return signal having a return angle distribution and produced by reflection of the at least one SA transmission signal from the target region;

applying a first spatial modulation to a first return signal component of the at least one SA return signal as a function of the return angle distribution to produce a first modulated return signal, the first spatial modulation having a first modulation profile;

detecting the first modulated return signal and generating therefrom a first modulated two-dimensional (2D) SA image of the target region;

applying a second spatial modulation to a second return signal component of the at least one SA return signal as a function of the return angle distribution to produce a second modulated return signal, the second spatial modulation having a second modulation profile different from the first modulation profile;

detecting the second modulated return signal and generating therefrom a second modulated 2D SA image of the target region; and combining the first modulated 2D SA image and the second modulated 2D SA image to obtain a three-dimensional (3D) SA image of the target region.

In accordance with another aspect, there is provided a system for synthetic aperture (SA) imaging of a target region from a platform in relative movement with respect to the target region along a travel path, the system including:

a transmitter-receiver assembly mounted on the platform and including:
- an SA transmitter configured to illuminate the target region with at least one SA transmission signal during at least one pass of the platform over the target region; and
- an SA receiver configured to collect at least one respective SA return signal having a return angle distribution and produced by reflection of the at least one SA transmission signal from the target region;

a spatial modulation assembly mounted on the platform and configured to apply a first spatial modulation to a first return signal component of the at least one SA return signal as a function of the return angle distribution to produce a first modulated return signal, the first spatial modulation having a first modulation profile, the spatial modulation assembly being configured to apply a second spatial modulation to a second return signal component of the at least one SA return signal as a function of the return angle distribution to produce a second modulated return signal, the second spatial modulation having a second modulation profile different from the first modulation profile;

a detector assembly mounted on the platform and configured to detect the first modulated return signal and the second modulated return signal; and a processing unit coupled to the detector assembly and configured to generate a first modulated two-dimensional (2D) SA image and a second modulated 2D SA image of the target region respectively from the first modulated return signal and the second modulated return signal, and combine the first modulated 2D SA image and the second modulated 2D SA image to obtain a three-dimensional (3D) SA image of the target region.

It is to be noted that other method steps may be performed prior, during or after the above-described steps. The order of one or more of the steps may also differ, and some of the steps may be omitted, repeated and/or combined, depending on the application.

Other features and advantages of the present description will become more apparent upon reading of the following non-restrictive description of specific embodiments thereof, given by way of example only with reference to the appended drawings.

BRIEF DESCRIPTION OF THE DRAWINGS

FIG. 2 also depicts various parameters and features of, or related to, the SA imaging system.

DETAILED DESCRIPTION

Figure 1:
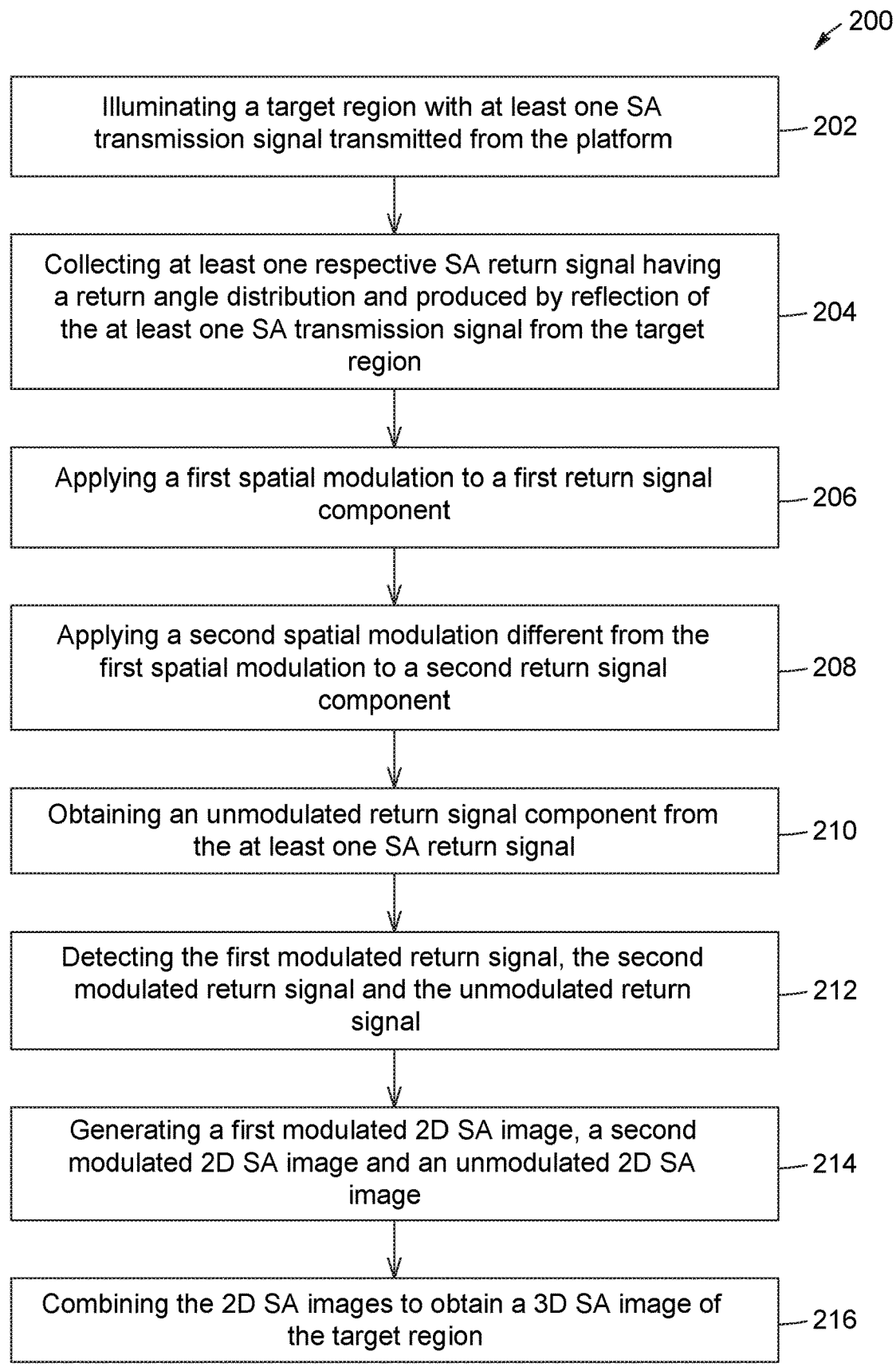
FIG. 1 is a flow diagram of a method for SA imaging, in accordance with a possible embodiment.

In the following description, similar features in the drawings have been given similar reference numerals and, to not unduly encumber the figures, some elements may not be indicated on some figures if they were already identified in a preceding figure. It should also be understood herein that the elements of the drawings are not necessarily depicted to scale, since emphasis is placed upon clearly illustrating the elements and structures of the present embodiments.

The present description generally relates to a method for three-dimensional (3D) synthetic aperture (SA) imaging and to an imaging system capable of implementing the method. The method generally uses spatial amplitude modulation of an SA return signal as a function of its return angle distribution to account for the local topography of a target region and provide 3D imaging capabilities. In some implementations, the method can involve a step of generating two spatially modulated 2D SA images of a target region using two different spatial modulation functions on the SA return signal, and a step of combining the two images to obtain a 3D SA image. The 3D SA image can then be used to determine an elevation map of the target region. The present techniques can be implemented in an imaging system mounted on a platform in relative movement with respect to the target region.

In the present description, the term "spatial optical modulation", or simply "spatial modulation", refers to a spatially-dependent variation in a characteristic of an electromagnetic signal or waveform, such as amplitude, phase, spectral content or other measurable properties. For example, spatial modulation can occur when one location on a plane or surface receiving an optical beam causes a different amplitude and/or phase variation in the optical beam than another location on that plane or surface. Depending on the application, the spatial modulation can be impressed on an optical beam by transmission, reflection, or other means, and be along a single direction or along multiple directions, all of these directions generally lying in a plane transverse to the propagation direction of the optical beam. As mentioned above, the present techniques generally use spatial amplitude modulation to provide 3D SA imaging capabilities. In some implementations, the spatial amplitude modulation can result from a direct spatial amplitude modulation, while in other implementations the spatial amplitude modulation is achieved, for example, by combining spatial phase modulation and propagation through appropriate optics.

The present techniques can be used in SA ladar (SAL) systems operating at wavelengths in the visible or near-infrared portions of the electromagnetic spectrum. However, the present techniques can also be employed in other types of SA imaging modalities, including, but not limited to, SA radar (SAR) imaging, SA terahertz imaging, and SA infrared imaging. In the present description, the terms "light" and "optical" are intended to refer to radiation in any appropriate region of the electromagnetic spectrum, for example, the radio, microwave, terahertz, infrared, visible, and ultraviolet wavelength ranges. For example, in SAL applications, the terms "light" and "optical" can encompass electromagnetic radiation having a wavelength ranging from a few hundreds of nanometers (nm) to a few micrometers (pm). Of course, other wavelength ranges may be considered in other embodiments.

In the present description, a 2D SA image of a target region refers to a 2D pixel array having an along-track dimension and an across-track dimension. Each pixel is associated with a respective area of the target region and provides a complex number including amplitude and phase information and representing the surface reflectance of the associated area. Meanwhile, a 3D SA image of a target region also refers to a 2D pixel array having an along-track dimension and an across-track dimension, in which each pixel is associated with a respective area of the target region. However, rather than providing reflectance-based information, each pixel of the 3D SA image has a value representative of the local height or elevation of the area of the target region associated with it.

Figure 2:
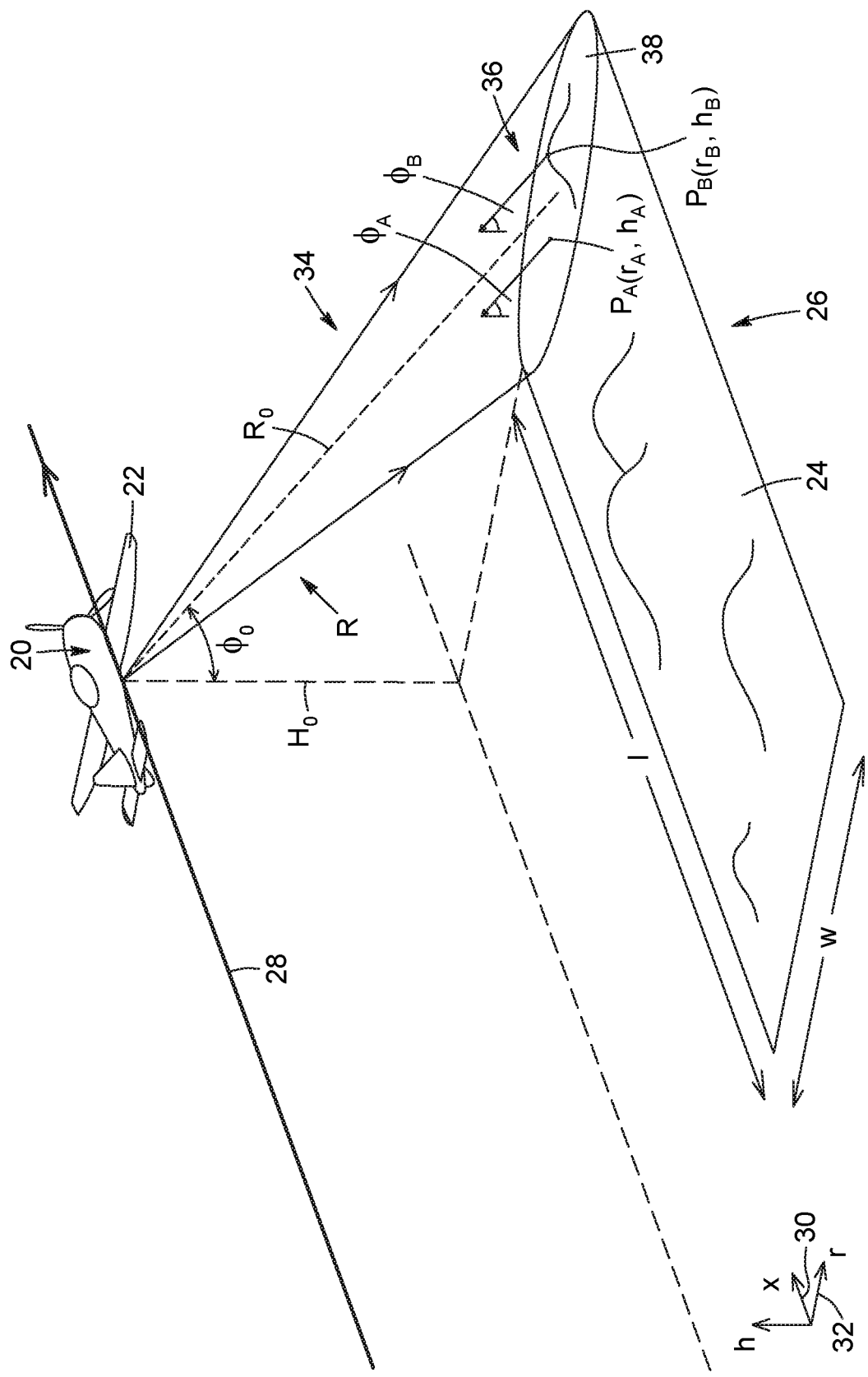
FIG. 2 is a schematic perspective view of a moving platform flying over a scene and on which is mounted an exemplary embodiment of an SA imaging system. The SA imaging system illuminates a target region of the scene with a transmission beam and collects a return light produced by reflection of the transmission beam from the target region.

Referring to FIG. 1, there is provided a flow diagram of an embodiment of a method 200 for SA imaging of a target region from a platform in relative movement with respect to the target region along a travel path. The method 200 of FIG. 1 can be implemented in an SA imaging system 20 mounted on a platform 22 that moves with respect to a target region 24 of a scene 26, such as illustrated in FIG. 2. In this embodiment, the platform 22 moves along a travel path 28 at an altitude $H_0$ above the target region 24. The target region 24 corresponds to an area or feature of interest in the scene 26, for example a ground surface of the Earth. The target region 24 has a length l along an azimuth direction 30 parallel to the travel path 28, and a width w along a ground-range direction 32 perpendicular to the azimuth direction 30. In FIG. 2, the platform 22 is an airplane that flies over a stationary target region 24. However, various other types of manned or unmanned airborne, spaceborne and terrestrial vehicles could be used in other embodiments. Moreover, in other embodiments, it can be the target region that moves with respect to the platform, while in yet other embodiments, both the platform and the target region can move.

Referring still to FIGS. 1 and 2, the method 200 includes a step 202 of illuminating the target region 24 with at least one SA transmission signal 34 transmitted from the platform 22. The method can also include a step 204 of receiving, on the platform 22, at least one respective SA return signal 36 having a return angle distribution and produced by reflection of the at least one SA transmission signal 34 from the target region 24. As discussed below, the number of SA transmission signals 34 and corresponding SA return signals 36 will generally depend on whether the method 200 is implemented in a one-pass or a multiple-pass operation. In FIG. 2, the target region 24 is illuminated in a zero-squint side-looking stripmap mode, in which the platform 22 moves along the azimuth direction 30 and the SA transmission signal 34 points perpendicularly to the travel path 28 along a slant-range direction R. However, other SA operation modes can be used in other variants, for example a scanning mode, a spotlight mode, and a forward- or backward-squinted side-looking stripmap mode. The illuminated area of the scene 26 at a given time, corresponding to a given position of the platform 22 is referred to as the footprint 38 of the SA transmission signal 34. As the platform 22 moves, the footprint 38 moves accordingly, thereby illuminating a swath that defines the target region 24.

Conventional 2D SA images S(x, R) have an along-track dimension measured in azimuth coordinate x and an across-track dimension measured in slant-range coordinate R. The fact that the across-track dimension is along the slant-range direction R, rather than along the ground-range direction r, can cause image distortions. For example, for a target region having a non-flat topography, an ambiguity exists between ground range r and elevation h, since various pairs of ground-range and elevation values (r, h) can be compatible with a given slant-range value R. This is because conventional SA imaging assumes that all return echoes originate from a two-dimensional flat surface.

Figure 3:
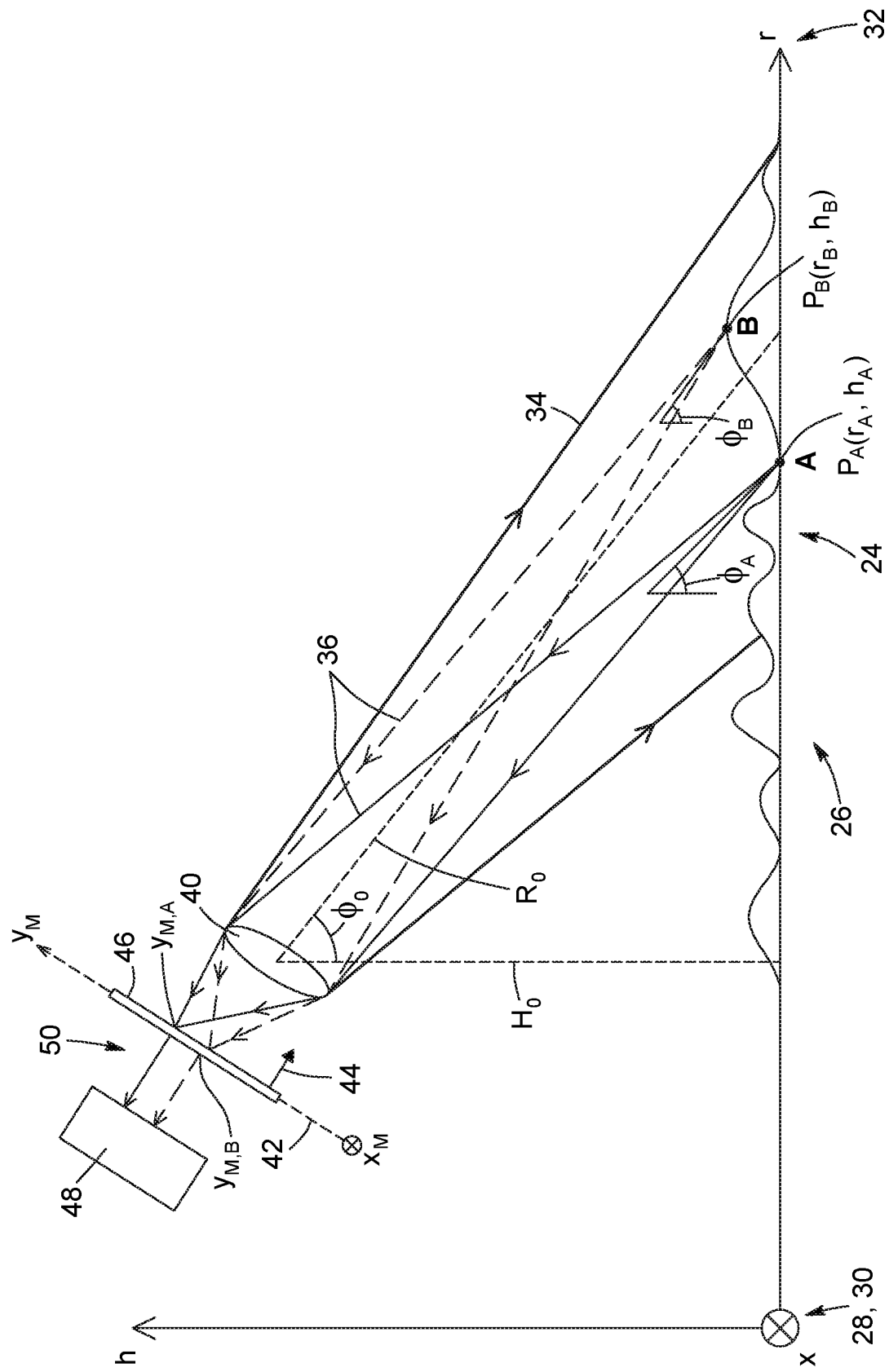
FIG. 3 is a schematic front view of the embodiment of FIG. 2.

This is illustrated in FIG. 3, which is a schematic front view of the embodiment of FIG. 2. In FIG. 3, the target region 24 includes scatterer A at position $P_A(r_A, h_A)$ and scatterer B at position $P_B(r_B, h_B)$. Scatterer positions $P_A(r_A, h_A)$ and $P_B(r_B, h_B)$ are located at the same slant-range R to the SA imaging system 20, but have different ground ranges $r_A$ and $r_B$ and heights $h_A$ and $h_B$. As mentioned above, interferometric SA imaging, referred to as IFSAR and IFSAL depending on the imaging wavelength can be used to remove this ambiguity and enable 3D SA imaging. However, as also mentioned above, conventional interferometric SA imaging has some drawbacks and limitations, especially in the case of IFSAL. As will now be described, the present techniques provide a different approach to 3D SA imaging that uses spatial amplitude modulation of SA return signals.

Referring still to FIG. 3, it is seen that scatterers A and B are illuminated at local incidence angles by the SA transmission signal 34, and therefore produce return echoes that are collected by the SA imaging system 20 at different return angles $\phi_A$ and $\phi_B$. This means that the SA return signal 36 produced by reflection of the SA transmission signal 34 from the entire target region 24 and collected by the SA imaging system 20 will generally include a distribution of return angles $\phi(x, R)$ that depends on the topography of the target region 24. In this context, the 3D SA imaging method described herein involves the application of a spatial modulation of the SA return signal 36 reflected from the target region 24 as a function of its return angle distribution. It is to be noted that in FIG. 3, the return angles are evaluated in a plane which is perpendicular to the travel path.

Some of the principles underlying the present method will now be considered with reference to FIG. 3. In this embodiment, the SA imaging system 20 includes an SA receiver 40 that collects the SA return signal 36 reflected from the target region. The SA receiver 40 has a back focal plane 42 on which the collected SA return signal 36 is focused. In the illustrated embodiment, the back focal plane 42 has a surface normal 44 perpendicular to the travel path 28 and, thus, to the azimuth direction 30. Also, positions on the back focal plane 42 can be described in terms of coordinates $(x_M, y_M)$, where $x_M$ and $y_M$ are measured along axes that are respectively parallel and perpendicular to the azimuth direction 30. As described below, such an orientation for the back focal plane 42 allows spatial modulation of the SA return signal 36 to be applied as a function of its return angle distribution. In such a configuration, it will be understood that components of the SA return signal 36 collected at different return angles will be focused at different corresponding positions on the back focal plane 42. This is illustrated in FIG. 3, where the components of the SA return signal 36 produced by scatterers A and B located at positions $P_A$ and $P_B$ on the target region 24 are focused at positions $y_{M,A}$ and $y_{M,B}$ on or near the back focal plane 42, respectively.

The SA imaging system 20 in FIG. 3 further includes a spatial modulation assembly 46 and a detector assembly 48. In the present description, the spatial modulation assembly can be embodied by any appropriate device or combination of devices capable of applying, to an electromagnetic signal, a spatial amplitude modulation as defined above. Depending on the application, the spatial modulation assembly 46 can perform either a static or a dynamic spatial modulation depending on whether its spatial modulation function or profile remains fixed or varies over time.

In FIG. 3, the spatial modulation assembly 46 is disposed in the back focal plane 42 of the SA receiver 40 and configured to apply a spatially varying amplitude modulation to the SA return signal 36 to produce a modulated return signal 50 for detection by the detector assembly 48. In the illustrated embodiment, the spatial modulation assembly 46 is embodied by a transmission mask having a spatially dependent transmission function that defines a modulation profile of the spatial modulation assembly 46. In the illustrated embodiment, this transmission function varies along the $y_M$-axis, which defines a modulation axis of the spatial modulation assembly 46, but remains constant along the $x_M$-axis such that the SA return signal 36 is not spatially modulated along the azimuth direction 30. Given the relationship between the return angle and the focusing position described above, the spatial modulation assembly 46 therefore allows for the amplitude of the SA return signal 36 to be spatially modulated as a function of its return angle distribution $\phi(x, R)$. In turn, such a spatial modulation of the SA return signal 36 can enable determination of the return angle distribution $\phi(x, R)$, from which a 3D SA image can be obtained. This 3D SA image provides the azimuth x, slant range R and return angle $\phi$ of each target element of the target region 24, and can be used to provide an elevation map of the target region 24.

In some implementations, the modulation profile of the spatial modulation applied by the spatial modulation assembly 46 can be sinusoidal. In such a case, the electric field amplitude $E_T(y_M)$ of the modulated return signal 50 outputted by spatial modulation assembly 46 as a function of $y_M$ can be expressed as follows:

$$E_T(y_M) = T(y_M) = \left[ a + b\cos\left(2\pi \frac{y_M}{P_y} - n\frac{\pi}{2}\right) \right] E_I(y_M). \tag{1}$$

In Equation (1), $T(y_M)$ is the modulation profile of the spatial modulation assembly 46; a, b and n are constants; $P_y$ is the spatial modulation period along $y_M$; and $E_I(y_M)$ is the electric field amplitude of the SA return signal 36 incident on the spatial modulation assembly 46. In implementations employing coherent detection (e.g., optical heterodyne detection), the modulated return signal 50 is mixed with a local oscillator (LO) signal $E_{LO}$, and the intensity $I_{det}$ of the detected signal is given by:

$$I_{det} \approx |E_{LO}|^2 + |E_T|^2 = 2|E_{LO}||E_T|\cos\theta, \tag{2}$$

where $\theta$ represents the relative phase between $E_{LO}$ and $E_T$. The signal of interest in the context of SA imaging is the term $2|E_{LO}||E_T|\cos\theta$, which is directly proportional to the modulation profile $T(y_M)$ of the spatial modulation assembly 46. The detected intensity $I_{det}$ is converted to electrical data, which can be digitally sampled and stored as return signal data. The return signal data can be processed using known signal extraction and processing techniques to generate a spatially modulated 2D SA image $S(x, R)$ of the target region.

The present method generally involves generating multiple spatially modulated 2D SA images, each image being characterized by a different modulation profile, and then combining these spatially modulated 2D SA images to yield a 3D SA image of the target region, from which an elevation map of the target region can be extracted.

The method 200 of FIG. 1 can include a step 206 of applying a first spatial modulation to a first return signal component of the at least one SA return signal as a function of the return angle distribution to produce a first modulated return signal, and a step 208 of applying a second spatial modulation to a second return signal component of the at least one SA return signal as a function of the return angle distribution to produce a second modulated return signal. The first spatial modulation has a first modulation profile and the second spatial modulation has a second modulation profile different from the first modulation profile. The method 200 can also include a step 210 of obtaining a third return signal component from the at least one SA return signal. In the embodiment of FIG. 1, no spatial modulation is impressed on the third return signal component, which can therefore be referred to as an "unmodulated" return signal component. It is to be noted that two or more than three return signal components can be used in other implementations.

As mentioned above, depending on the application, the method 200 of FIG. 1 can be implemented in a one-pass or a multiple-pass operation. In a one-pass implementation, one SA transmission signal is used to produce one SA return signal. Different return signal components of the SA return signal can be used to obtain different 2D SA images of the target region, both with and without spatial modulation. These return signal components may or may not be all identical. In some implementations, the return signal components can be obtained by performing either a power splitting or a spectral splitting of the collected SA return signal. In other implementations, the return signal components can be obtained by performing a time-based splitting of the collected SA return signal, in which the collected SA return signal is divided temporally into the return signal components. In a multiple-pass implementation, each pass uses one SA transmission signal to produce one SA return signal. In some scenarios, the number of passes is equal to the number of 2D SA images to be generated and, thus, to the number of return signal components. In such cases, each SA return signal is used to obtain a corresponding one of the return signal components. In other scenarios, the number of passes is less than the number of 2D SA images to be generated, and thus to the number of return signal components. In such cases, each SA return signal is used to provide one or more than one of the return signal components.

The method 200 also includes a step 212 of detecting the first modulated return signal, the second modulated return signal and, as an unmodulated return signal, the third return signal component. The method further includes a step 214 of generating a first modulated 2D SA image $S_1(x, R)$ from the detected first modulated return signal, a second modulated 2D SA image $S_2(x, R)$ from the detected second modulated return signal, and an unmodulated 2D SA image $S_0(x, R)$ from the unmodulated return signal. It is to be noted that the general principles underlying the generation of 2D SA images from return signal data are known in the art, and need not be covered in detail herein.

Returning to Equation (1), various spatial modulation profiles can be obtained depending on the values for parameters a, b and n. For example, a 2D SA image $S_0(x, R)$ without spatial modulation, also referred to herein as an unmodulated 2D SA image, can be obtained if a=1 and b=0. Meanwhile, a 2D SA image $S_1(x, R)$ with a cosine amplitude modulation can be obtained if b≠0 and n=0, and a 2D SA image $S_2(x, R)$ with a sine amplitude modulation can be obtained if b≠0 and n=1. It is to be noted that in some implementations, the modulation profiles used to obtain the modulated 2D SA images $S_1(x, R)$ and $S_2(x, R)$ need not be sinusoidal, or even periodic, if the images $S_1(x, R)$ and $S_2(x, R)$ can be subsequently processed to retrieve the return angle distribution and, therefrom, a 3D SA image. Likewise, in some implementations, the relative phase shift between the two modulation profiles may differ from $\pi/2$ radians.

As mentioned above, depending on the application, the images $S_0(x, R)$, $S_1(x, R)$ and $S_2(x, R)$ can be generated from return signal data collected in a one-pass or a multiple-pass operation. Non-limiting examples of image acquisition scenarios include: (I) a three-pass operation consisting of one pass with a=1 and b=0 to generate the unmodulated 2D SA image $S_0(x, R)$, one pass with b≠0 and n=0 to generate the first cosine-modulated 2D SA image $S_1(x, R)$, and one pass with b≠0 and n=1 to generate the second sine-modulated 2D SA image $S_2(x, R)$; (II) a one-pass operation in which the SA imaging system includes three detectors and two modulators; and (III) a one-pass operation in which the SA imaging system includes one detector and one active modulator whose modulation profile varies periodically in time (e.g., from pulse to pulse) between an unmodulated, a cosine, and a sine profile.

From Equation (1), the cosine- and sine-modulated 2D SA images $S_1(x, R)$ and $S_2(x, R)$ can be expressed in terms of $S_0(x, R)$ as follows:

$$S_1(x, R) = S_0(x, R)\left[a + b\cos\left(2\pi \frac{\phi(x, R)}{P_\phi}\right)\right], \quad (3)$$

$$S_2(x, R) = S_0(x, R)\left[a + b\sin\left(2\pi \frac{\phi(x, R)}{P_\phi}\right)\right], \quad (4)$$

where $\phi(x, R)$ is the return angle distribution and $P_\phi$ is the angular modulation period. The return angle distribution $\phi(x, R)$ is related to $y_M$ by the relationship $\phi(x, R)=y_M/f$ and the angular modulation period $P_\phi$ is related to the spatial modulation period $P_y$ by the relationship: $P_\phi=P_y/f$, where f is the back focal length of the SA receiver 40. Each one of the SA images $S_0(x, R)$, $S_1(x, R)$ and $S_2(x, R)$ can be represented as a 2D pixel array having an along-track dimension measured in azimuth coordinate x and an across-track dimension measured in slant-range coordinate R, where each pixel provides a complex number representing the surface reflectance of an associated area of the target region. It is to be noted that in Equations (3) and (4), the unmodulated image $S_0(x, R)$ provides a reference image as a function of which the modulated image $S_1(x, R)$ and $S_2(x, R)$ can be defined. The unmodulated image $S_0(x, R)$ can also enable or help enable self-calibration of certain parameters of the SA imaging system 20 such as, for example, its illumination and detection profiles. However, in some implementations, the provision of an unmodulated 2D SA image can be omitted, for example when the target region has a known or uniform ground reflectance.

The method 200 of FIG. 1 further includes a step 216 of combining the first modulated 2D SA image $S_1(x, R)$, the second modulated 2D SA image $S_2(x, R)$ and the unmodulated 2D SA image $S_0(x, R)$ to obtain a 3D SA image of the target region. When the modulated images $S_1(x, R)$ and $S_2(x, R)$ are given by Equations (3) and (4), the three 2D SA images can be coco-registered and combined pixel-by-pixel as follows:

$$\psi_{PW,0}(R, x) = arg\left[\left(\frac{S_1(x, R)}{S_0(x, R)} - a\right) + i\left(\frac{S_2(x, R)}{S_0(x, R)} - a\right)\right] = 2\pi \frac{\phi(x, R)}{P_\phi}, \quad (5)$$

where $\psi_{PW,0}(x, R)$ is a phase-wrapped 3D SA image of the target region and the operator arg[z] returns the phase of a complex number z. The matrix $\psi_{PW,0}(x, R)$ can be represented as a 2D pixel array having an along-track dimension measured in azimuth coordinate x and an across-track dimension measured in slant-range coordinate R, in which each pixel provides a wrapped phase value that can be converted to an elevation value by phase unwrapping. Indeed, as described below, because phase differences can only be measured modulo $2\pi$, an absolute phase ambiguity exists that can be resolved by unwrapping the phase-wrapped 3D SA to extract the elevation map of the target region. It is to be noted that Equation (5) is provided for exemplary purposes and that other analytical and/or numerical computational techniques can be used in other embodiments to obtain a 3D SA image from 2D SA images, among which at least some are spatially modulated.

Like in IFSAR and IFSAL, the flat Earth phase difference can be removed from $\psi_{PW,0}(x, R)$ to form a flat-Earth-corrected phase-wrapped image $\psi_{PW}(x, R)$ as follows:

$$\psi_{PW}(x, R) = \psi_{PW,0}(x, R) - \psi_{FE}(x, R), \quad (6)$$

where $\psi_{FE}(x, R)$ is the flat Earth phase difference, which can be expressed as:

$$\psi_{FE}(x, R) = \frac{2\pi}{P_\phi}\arccos\left(\frac{H_0}{R}\right) = \frac{2\pi}{P_\phi}\arccos\left(\frac{R_0\cos\phi_0}{R}\right), \quad (7)$$

where $R_0$ is the slant range to a perfectly flat target region as measured along the nominal illumination axis of the SA transmission signal at an altitude $H_0$, and $\phi_0$ is the angle such that $H_0=R_0\cos\phi_0$ (see, e.g., FIGS. 2 and 3). The flat Earth phase difference represents the phase behavior for a perfectly flat target region. By removing $\psi_{FE}(x, R)$ from $\psi_{PW,0}(x, R)$, any additional phase difference will be due to the target region topography relative to the flat Earth.

Like $\psi_{PW,0}(x, R)$, the term $\psi_{PW}(x, R)$ is generally phase-wrapped. This means that the generation of the 3D SA image of the target region generally involves a step of unwrapping the phase-wrapped 3D SA image $\psi_{PW}(x, R)$ to obtain a phase-unwrapped 3D SA image $\psi_{PU}(x, R)$. In the present description, phase unwrapping aims to resolve $2\pi$ ambiguities in the flat-Earth-corrected phase-wrapped 3D SA image $\psi_{PW}(x, R)$ by determining a phase-unwrapped 3D SA image $\psi_{PU}(x, R)$ in which wrapped phase values are replaced by unambiguous elevation. That is, the phase-unwrapped 3D SA image $\psi_{PU}(x, R)$ can be represented as a 2D pixel array having an azimuth dimension x and a slant-range dimension R, where each pixel has a value corresponding to the local elevation at the azimuth and slant-range coordinates of the pixel. The general principles underlying phase unwrapping in SA imaging are known in the art and need not be covered in detail herein. In some implementations, a digital elevation model, for example determined by lidar, can be used to assist the phase unwrapping operation.

Performing a phase unwrapping of $\psi_{PW}(x, R)$ given by Equation (6) to obtain $\psi_{PU}(x, R)$ yields:

$$\psi_{PU}(x, R) = \text{unwrap}[\psi_{PW}(x, R)] = \frac{2\pi}{P_\phi}\delta\phi(x, R), \quad (8)$$

where unwrap[ ] is a 2D phase-unwrapping operator, and $(2\pi/P_\phi)\delta\phi(x, R)$ represents the phase variations caused by the non-flat topography $h(x, R)$ of the target region relative to the uniform topography of a perfectly flat target region. Considering that $$\cos\phi(x, R) = \frac{H_0 - h(x, R)}{R}, \quad (9)$$

$$\cos[\phi(x, R) - \delta\phi(x, R)] = \frac{H_0}{R} \approx \cos\phi(x, R) + \delta\phi(x, R)\sin\phi(x, R), \quad (10)$$

the term $\delta\phi(x, R)$ can be approximated as follows: $\delta\phi(x, R)\approx h(x, R)/R\sin\phi(x, R)$. Using this approximation for $\delta\phi(x, R)$ in Equation (8) yields:

$$\psi_{PU}(x, R) \approx \frac{2\pi}{P_\phi}\left[\frac{h(x, R)}{R\sin\phi(x, R)}\right]. \quad (11)$$

Using the first-order approximation R sin φ(x, R)≈R₀ sin φ₀. Equation (11) simplifies to:

$$\psi_{PU}(x, R) \approx \frac{2\pi}{P_\phi}\left[\frac{h(x, R)}{R_0 \sin\phi_0}\right]. \quad (12)$$

Equation (12) can then be used to determine the elevation map h(x, R) of the target region:

$$h(x, R) \approx \left(\frac{P_\phi R_0 \sin\phi_0}{2\pi}\right)\psi_{PU}(x, R). \quad (13)$$

It is to be noted that in some implementations, the method 200 can further include an orthorectification step to project the phase-unwrapped 3D SA image $\psi_{PU}$(x, R) or the elevation map h(x, R) to ground range and provide representation of the target region as if viewed directly from above.

From Equation (13), the elevation dynamic range $h_{2\pi}$ before phase wrapping occurs is $h_{2\pi} = P_\phi R_0 \sin\phi_0$. Furthermore, using a typical phase resolution of 2π/20 on $\psi_{PU}$(x, R) in Equation (13), the elevation resolution Δh can be approximated by:

$$\Delta h \approx \frac{P_\phi R_0 \sin\phi_0}{20} = \frac{P_y R_0 \sin\phi_0}{20f}. \quad (14)$$

It is to be noted that the exemplary implementation of the method steps described above by reference to Equations (3) to (14) assumes that the first and second modulated 2D SA images S₁(x, R) and S₂(x, R) are modulated according to sinusoidal modulation profiles shifted by a quarter period relative to each other. However, other implementations can use other modulation profiles to obtain S₁(x, R) and S₂(x, R). For example, in some implementations, if the modulation profiles deviate significantly from sinusoidal functions, a calibration process can be performed. This calibration process can involve measuring reference images $S_{0,ref}$(x, R), $S_{1,ref}$(x, R) and $S_{2,ref}$(x, R) with a reference target region having a flat topography, and using these reference images to compute the flat Earth phase difference $\psi_{FE}$(x, R) as follows:

$$\psi_{FE}(x, R) = \arg\left[\left(\frac{S_{1,ref}(x, R)}{S_{0,ref}(x, R)} - a\right) + i\left(\frac{S_{2,ref}(x, R)}{S_{0,ref}(x, R)} - a\right)\right]. \quad (15)$$

In such a case, the flat Earth phase difference $\psi_{FE}$(x, R) for use in Equation (6) can be obtained from Equation (15) instead of Equation (7).

Other implementations based on non-sinusoidal spatial modulation profiles can use a 2D calibration contour plot of wrapped phase values in relation to the S₁(x, R)/S₀(x, R) ratio along one axis and the S₂(x, R)/S₀(x, R) ratio along the other axis. In such a case, pairs of measured S₁(x, R)/S₀(x, R) and S₂(x, R)/S₀(x, R) ratios are fitted on the calibration contour plot to determine pixel-by-pixel the phase value corresponding to every pair, and then the elevation map h(x, R) of the target region.

Non-limiting examples of SA imaging system embodiments will now be described by reference to FIGS. 4 to 10, each embodiment providing a different implementation of the spatial modulation assembly.

Figure 4:
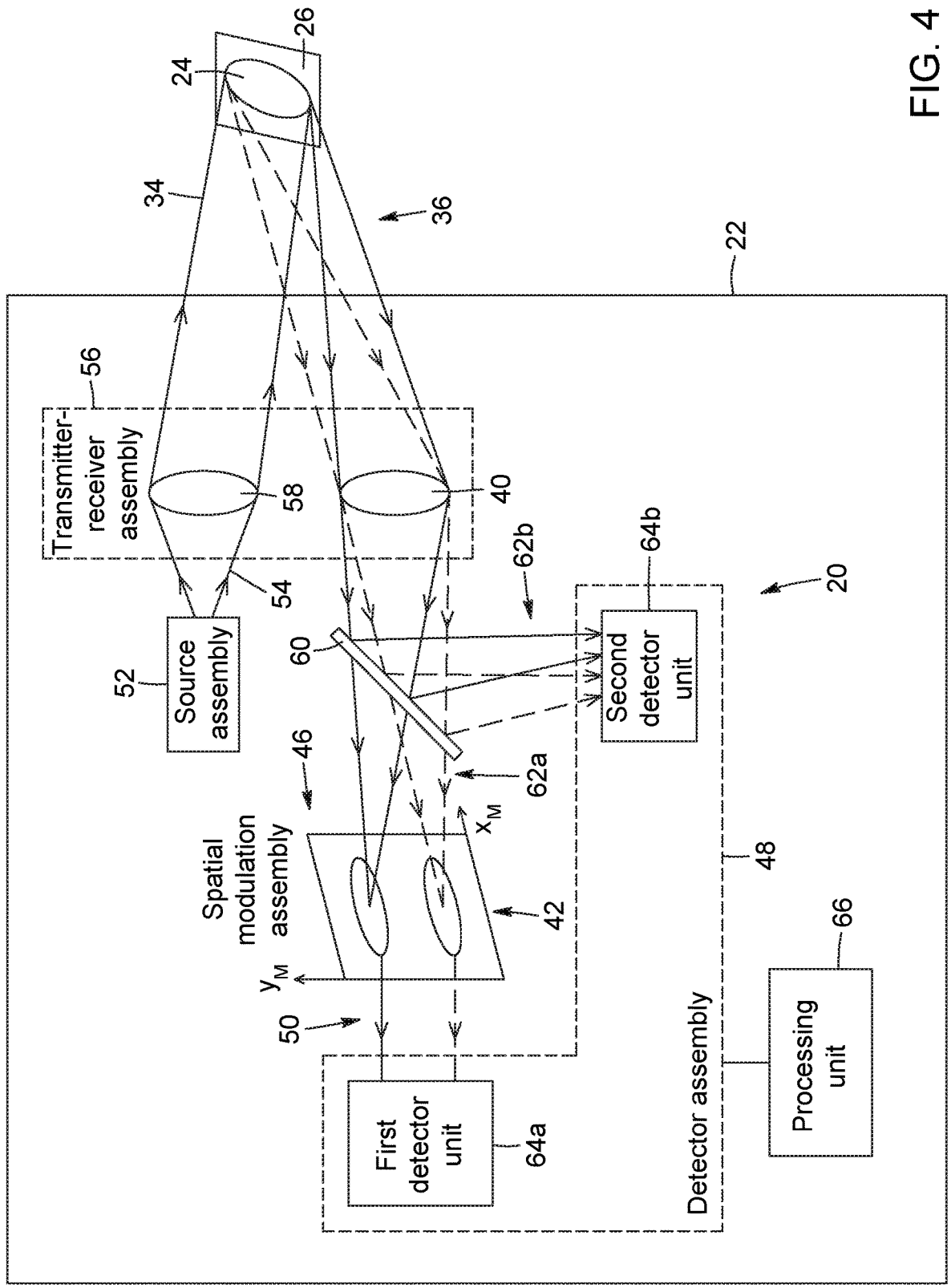
FIG. 4 is a schematic block diagram of an exemplary embodiment of a dual-pass SA imaging system having a transmission-based spatial modulation assembly.

Referring first to FIG. 4, there is provided a schematic block diagram of an embodiment of an SA imaging system 20 configured for dual-pass SAL applications, for example in the near-infrared. The SA imaging system 20 of FIG. 4 can be used to implement the method 200 of FIG. 1. The SA imaging system 20 includes a source assembly 52 mounted on the platform 22 and configured to generate a source signal 54. The source assembly 52 can be embodied by any appropriate device or combination of devices apt to generate a source optical signal from which an SA transmission signal suitable for SA imaging can be produced. In SAL applications, the SA transmission signal 34 can have a center frequency ranging from about 30 terahertz (THz) to about 300 THz, for example 193 THz, corresponding to a wavelength of 1.55 μm. Non-limiting examples for the source assembly 52 include a gas laser, a solid-state laser, a diode laser, a dye laser, and a non-laser source. For example, in some implementations, the source assembly 52 can include a pulsed fiber laser provided with a directly modulated laser diode configured to perform a linear or nonlinear frequency modulation, or chirp, of the source signal 54. Alternatively, the source assembly 52 can be a continuous-wave optical source whose output is coupled to an external waveform modulator or phase shifter. Depending on the application, the SA imaging system 20 can use fiber-based or bulk optical components for optical signal propagation.

Referring still to FIG. 4, the SA imaging system 20 includes a transmitter-receiver assembly 56 mounted on the platform 22. The transmitter-receiver assembly 56 can include an SA transmitter 58 for illuminating the target region 24 with an SA transmission signal 34 corresponding to the source signal 54, or a portion thereof. In SAL applications, the SA transmission signal 34 generally has a linear chirp waveform inherited from the source signal 54. The SA transmitter 58 can include appropriate optics to shape or condition the SA transmission signal 34 projected onto the target region 24. The transmitter-receiver assembly 56 can also include an SA receiver 40 configured to receive an SA return signal 36 produced by reflection of the SA transmission signal 34 from the target region 24. The SA receiver 40 can include appropriate optics, for example lens, mirrors or optical filters, to collect the SA return signal 36. Depending on the application, the SA transmitter 58 and the SA receiver 40 can be provided as separate devices or combined as a transceiver. The SA imaging system 20 also includes an optical splitter 60, configured to perform a power splitting of the SA return signal 36 into a first return signal component 62a and a second return signal component 62b. Alternatively, the optical splitter 60 can be configured to a time-based splitting of the SA return signal 36 to produce the first and second return signal component 62a, 62b.

Figure 5:
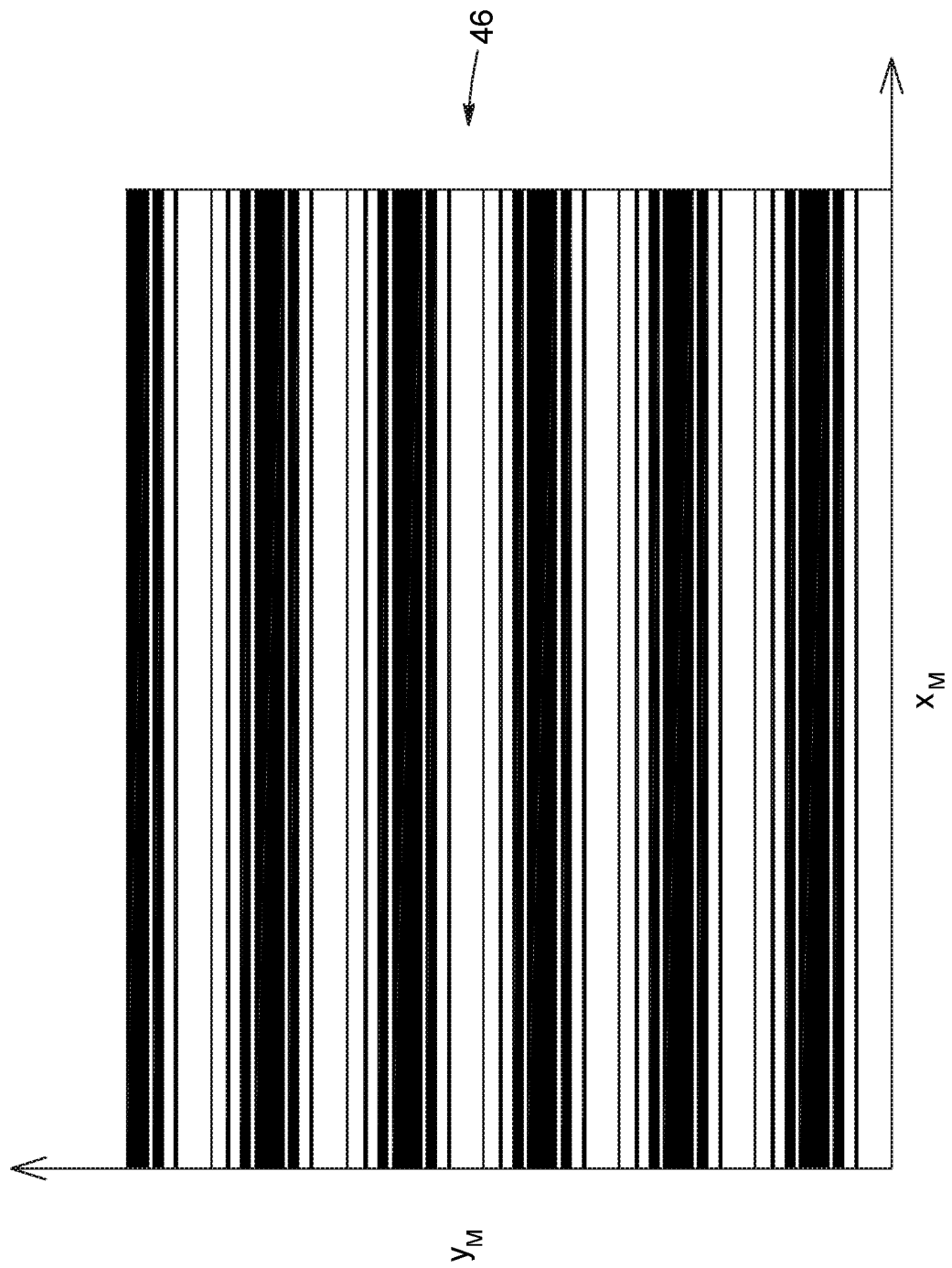
FIG. 5 is a schematic representation of an exemplary implementation of a spatial modulation assembly embodied by a transmission mask.

Referring still to FIG. 4, the SA imaging system 20 includes a spatial modulation assembly 46 disposed in the path of and configured to apply a first spatial amplitude modulation to the first return signal component 62a to produce a modulated return signal 50. No spatial modulation is applied to the second return signal component 62b. The spatial modulation assembly 46 can be disposed in a back focal plane 42 of the SA receiver 40 and oriented with respect to the target region 24 to spatially modulate the first return signal component 62a as a function of its return angle distribution. In the illustrated embodiment, the spatial modulation assembly 46 is embodied by a transmission mask having a first modulation profile $T_1(y_M)$ along a modulation axis $y_M$ lying in a back focal plane 42 of the SA receiver 40 and along a direction perpendicular to the travel path. As mentioned above, such an orientation for the modulation axis allows for the amplitude of the first return signal component 62a to be spatially modulated according to its return angle distribution $\phi(x, R)$. In some implementations, the first modulation profile $T_1(y_M)$ can follow a cosine function, as in Equation (1) with $b \neq 0$ and $n=0$, although other functions can be used in other implementations. Referring briefly to FIG. 5, in one embodiment, the spatial modulation assembly 46 can be a transmission mask embodied by a metal stencil having a pattern of openings formed therein along the $y_M$-axis, which pattern resulting in a cosine-shaped modulation profile $T_1(y_M)$. Of course, other types of transmission-based spatial modulation assembly 46 can be used in other implementations.

Returning to FIG. 4, the SA imaging system 20 further includes a detector assembly 48 mounted on the platform 22. The detector assembly 48 is configured to detect the modulated return signal 50 and, as an unmodulated return signal, the second return signal component 62b. In the illustrated embodiment, the detector assembly 48 includes a first detector unit 64a that detects the modulated return signal 50 and a second detector unit 64b that detects the second return signal component 62b. The first and second detector units 64a, 64b can each include one or more photodetectors, for example PIN or avalanche photodiode detectors. As is typical in SAL applications, the detection process can employ optical heterodyning with chirped signals. This process can involve mixing, before detection, each one of the modulated return signal 50 and the second return signal component 62b with a corresponding local oscillator (LO) signal coherent with the source signal 54. In each case, this mixing of a return signal and an LO signal generates an electrical signal containing a beatnote whose frequency depends, in the case of chirped signals, on the relative time delay between the mixed signals and, thus, on the round-trip slant from the SA transmitter 58 to the target region 24 and back to the SA receiver 40. The measured electrical signals can be digitally sampled and stored as return signal data.

The SA imaging system 20 of FIG. 4 can further include a processing unit 66 coupled to the detector assembly 48. The processing unit 66 can be provided as a single unit or as a plurality of interconnected sub-units, and be implemented in hardware, software, firmware or any combination thereof. For example, the processing unit 66 can be embodied by a microprocessor, a central processing unit (CPU), a microcontroller, or by any other processing resource or any combination of such processing resources configured to operate collectively as a processing unit. The return signal data can be transmitted from the detector assembly 48 to the processing unit 66 via wired and/or wireless transmission links. Depending on the application, the processing unit 66 can be physically located on the moving platform 22 or at another location, for example at a ground-based processing station. The processing unit 66 is configured to generate a first modulated 2D SA image $S_1(x, R)$ from the return signal data associated with the modulated return signal 50, and an unmodulated 2D SA image $S_0(x, R)$ from the return signal data associated with the second return signal component 62b. In the case of a cosine amplitude modulation, the first modulated 2D SA image $S_1(x, R)$ can be described by Equation (3).

It will be understood that the cosine-modulated image $S_1(x, R)$ and the unmodulated image $S_0(x, R)$ are obtained in one of the two passes of the SA imaging system 20 over the target region 24. In the other pass, the transmission function of the spatial modulation assembly 46 can be shifted by a quarter period, resulting in a sine-shaped modulation profile $T_2(y_M)$, as in Equation (1) with $b \neq 0$ and $n=1$. Alternatively, another spatial modulation assembly 46 can be used during the other pass. Following this other pass, a second modulated 2D SA image $S_2(x, R)$ can be generated from the return signal data associated with the modulated return signal 50, which in the case of a sine amplitude modulation can be described by Equation (4). Then, the first modulated 2D SA image $S_1(x, R)$, the second modulated 2D SA image $S_2(x, R)$ and the unmodulated 2D SA image $S_0(x, R)$ can be combined to obtain a 3D SA image and elevation map of the target region 24, such as described above. It is to be noted that depending on the application, an unmodulated image can be generated in either one or both of the two passes. In the latter scenario, the two unmodulated images can be coco-registered and combined to provide a resulting unmodulated image with improved quality.

Figure 6:
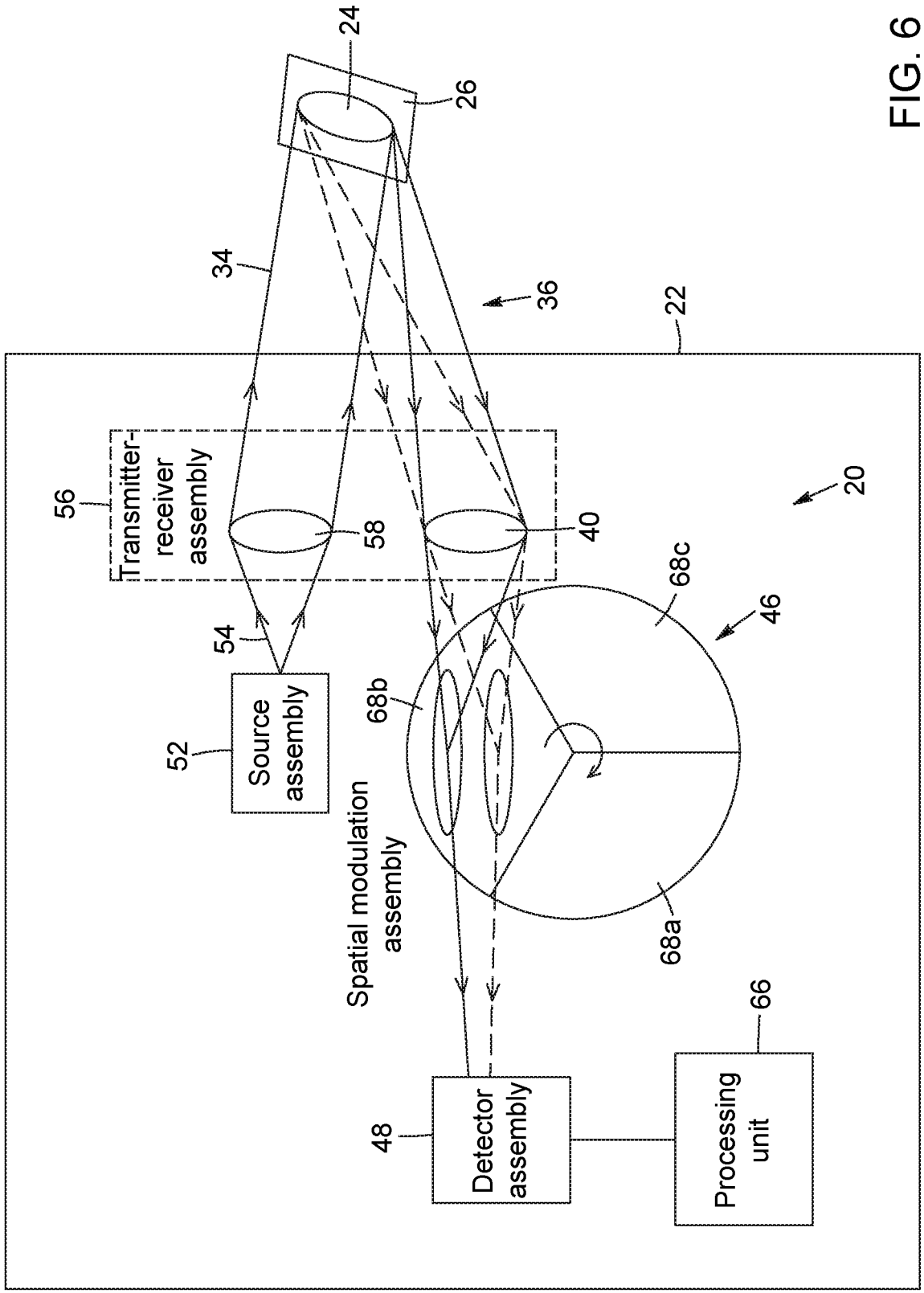
FIG. 6 is a schematic block diagram of an exemplary embodiment of a one-pass SA imaging system having a transmission-based spatial modulation assembly.
Figure 7:
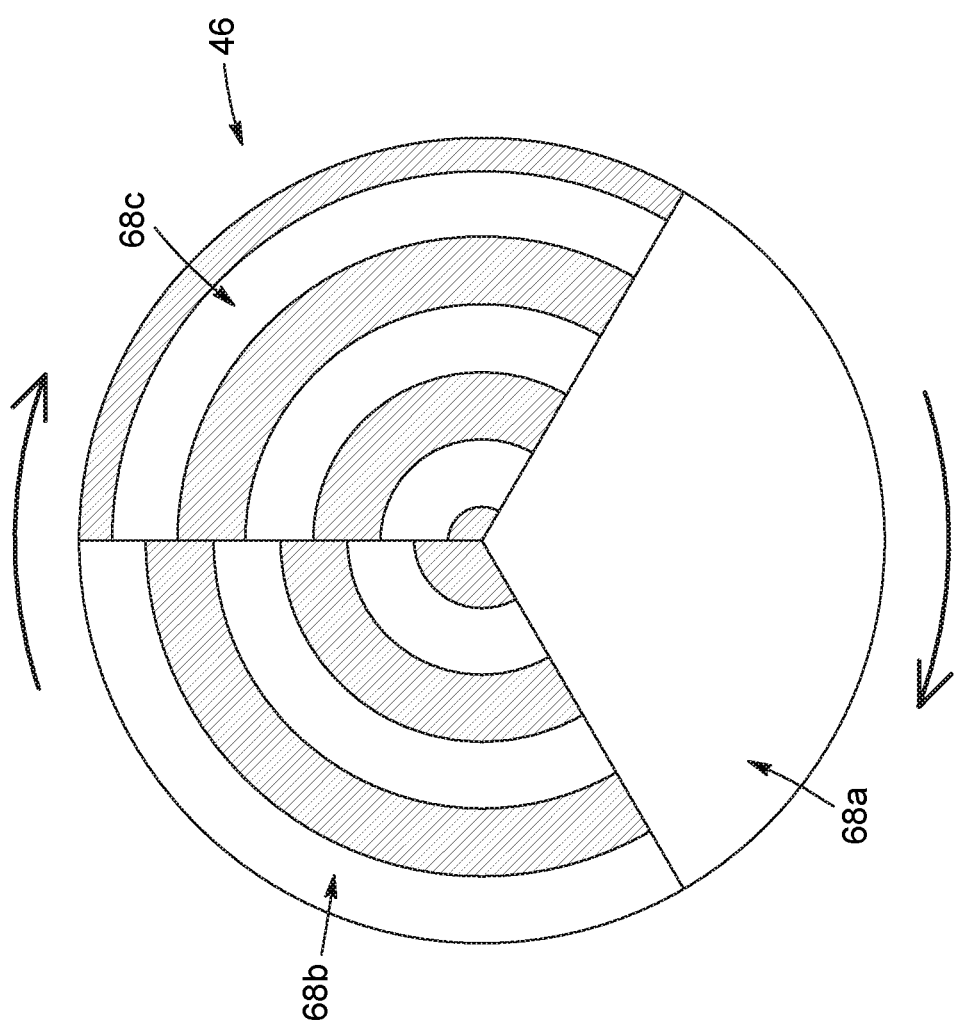
FIG. 7 is a schematic representation of an exemplary implementation of a spatial modulation assembly embodied by a rotating transmission mask.

Referring now to FIG. 6, there is illustrated embodiment of an SA imaging system 20, which provides a one-pass operation. This embodiment shares several features with that of FIG. 4, including a source assembly 52, a transmitter-receiver assembly 56 having an SA transmitter 58 and an SA receiver 40, a spatial modulation assembly 46, a detector assembly 48, and a processing unit 66. These features need not be described again in detail other than to highlight differences. In the embodiment of FIG. 6, the spatial modulation assembly 46 operates in transmission as in FIG. 4, but moves as a function of time to provide a dynamic spatial modulation and, thus, a one-pass operation. In contrast, the spatial modulation assembly 46 of FIG. 4 provides, during each pass, a static spatial modulation. Referring further to FIG. 7, the spatial modulation assembly 46 of FIG. 6 is embodied by a rotating transmission mask disposed in the back focal plane 42 of the SA receiver 40 and having a first region 68a with a transmission function equal or close to unity, a second region 68b with a transmission function having a cosine profile, and a third region 68c with a transmission function having a sine profile. Due to the rotation of the mask, each one of the first, second and third regions 68a, 68b, 68c will be in the path of the collected SA return signal 36 during a respective time interval of the rotation period, thus allowing the 2D SA images $S_0(x, R)$, $S_1(x, R)$ and $S_2(x, R)$ to be acquired all during a single pass of the SA imaging system 20 over the target region 24.

Figure 8:
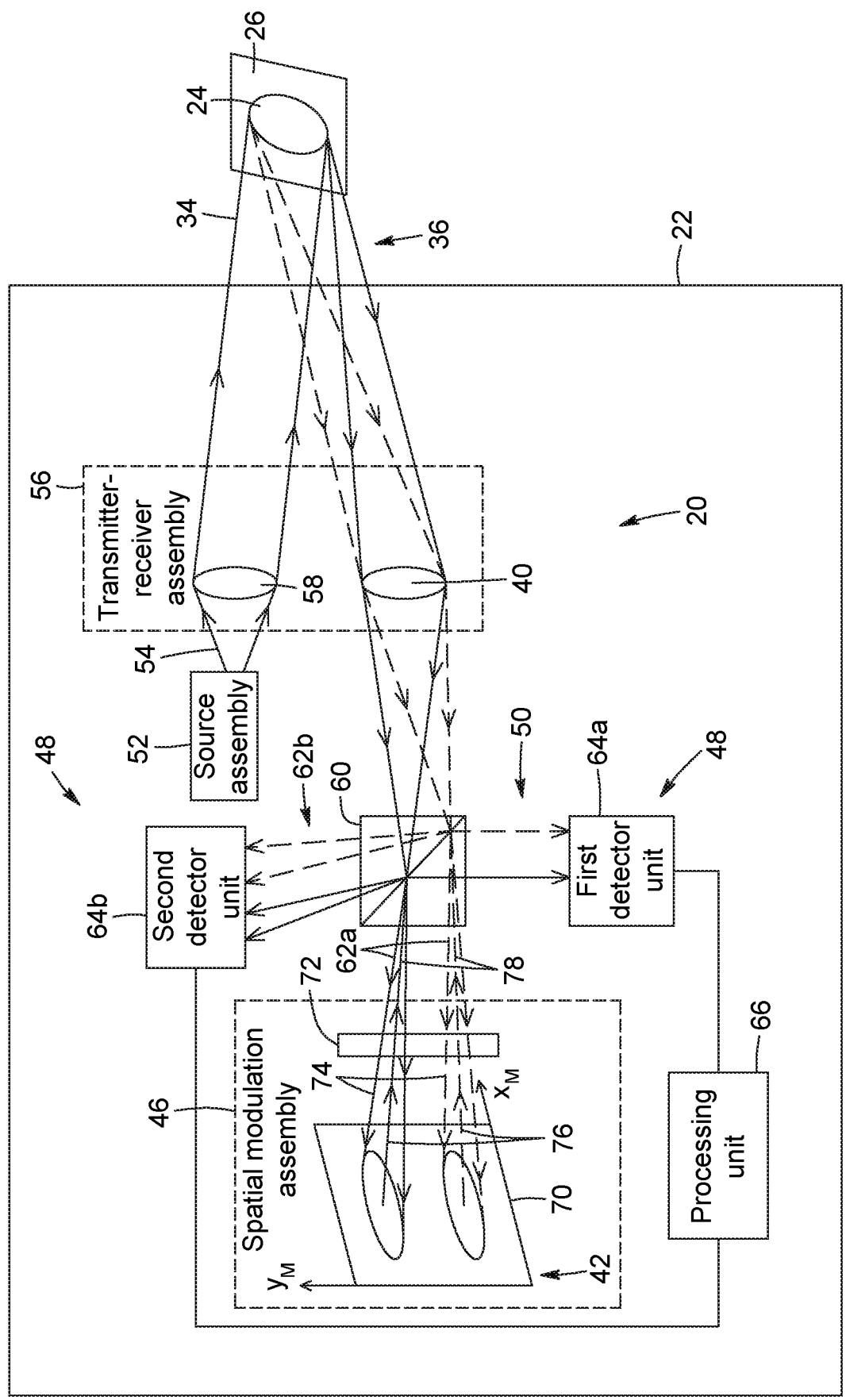
FIG. 8 is a block diagram of an exemplary embodiment of a dual-pass SA imaging system having a spatial modulation assembly that includes a spatial light modulator.

Referring to FIG. 8, there is illustrated another embodiment of a dual-pass SA imaging system 20. This embodiment shares several features with that of FIG. 4, including a source assembly 52, a transmitter-receiver assembly 56 having an SA transmitter 58 and an SA receiver 40, a spatial modulation assembly 46, a detector assembly 48 including first and second detector units 64a, 64b, and a processing unit 66. These features need not be described again in detail other than to highlight differences.

In the embodiment of FIG. 8, the spatial modulation assembly 46 includes a spatial light modulator 70. In the present description, the term "spatial light modulator" refers to a device that includes an array of light modulating elements that can control or modify a characteristic of an electromagnetic signal or waveform incident thereon (e.g., amplitude, phase, spectral content, polarization or propagation direction), and its associated control circuitry. Depending on the application, the spatial light modulator can be transmissive or reflective. Non-limiting examples of spatial light modulators include digital micromirror devices and liquid crystal devices. In the embodiment of FIG. 8, the spatial light modulator 70 is embodied by a reflective phase-only spatial light modulator based on liquid crystal microdisplay cells. In such a case, light incident on a cell of the array is reflected with nearly constant reflectivity, that is, with no amplitude modulation. However, the refractive index of each cell is individually controlled electrically to introduce an adjustable time-delay and, thus, modify locally the phase of the incident light. By allowing the time-delays and associated phase shifts to vary with position on the array, the phase of the electric field of the reflected optical wavefront is spatially modulated.

Referring still to FIG. 8, the spatial modulation assembly 46 also includes an optical splitter 60 configured to split the SA return signal 36 into a first return signal component 62a and a second return signal component 62b. The optical splitter 60 is embodied by a polarizing beam splitter such that the first and second return signal components 62a, 62b are orthogonally polarized. It is to be noted that SA return signals are generally unpolarized. In FIG. 8, the first return signal component 62a is p-polarized and passes through the polarizing beam splitter. Meanwhile, the second return signal component 62b is s-polarized and reflected by the polarizing beam splitter toward the second detector unit 64b for detection as an unmodulated return signal, which can be processed by the processing unit 66 to generate an unmodulated 2D SA image $S_0(x, R)$ of the target region 24, such as described above. It is to be noted that other configurations could be used in which it is the first return signal component 62a that is s-polarized and/or reflected by the polarizing beam splitter, while the second return signal component is 62b is p-polarized and/or passed through the polarizing beam splitter.

The spatial modulation assembly 46 further includes a half-wave plate 72 disposed in the path of the first return signal component 62a. The normalized electric field amplitude electric $E_{W1}$ of the signal 74 transmitted by the half-wave plate 72 can be expressed as:

$$E_{W1} = \begin{bmatrix} \cos 2\alpha & \sin 2\alpha \\ \sin 2\alpha & -\cos 2\alpha \end{bmatrix} \quad (16)$$

$$E_{RS} = \begin{bmatrix} \cos 2\alpha & \sin 2\alpha \\ \sin 2\alpha & -\cos 2\alpha \end{bmatrix} \begin{bmatrix} 1 \\ 0 \end{bmatrix} = \begin{bmatrix} \cos 2\alpha \\ \sin 2\alpha \end{bmatrix} = \frac{1}{\sqrt{2}} \begin{bmatrix} 1 \\ 1 \end{bmatrix},$$

where $E_{RS}$ is the normalized electric field amplitude of the first return signal component 62a and α is the angle between the fast axis of the half-wave plate 72 and the x-axis. By setting α to 22.5°, the half-wave plate 72 serves to rotate the polarization of the first return signal component 62a by 45° before reaching the spatial light modulator 70. In the illustrated embodiment, the spatial light modulator is configured to apply a phase modulation only to the y-component of the signal 74 transmitted by the half-wave plate 72. The normalized electric field amplitude $E_{SLM}(y_M)$ of the phase-modulated signal 76 reflected by the spatial light modulator 70 can be expressed as:

$$E_{SLM}(y_M) = \frac{1}{\sqrt{2}} \begin{bmatrix} -1 \\ e^{i\theta(y_M)} \end{bmatrix}, \quad (17)$$

where the phase-shift $\theta(y_M)$ produced on the y-component of the phase-modulated signal 76 depends on the position $y_M$ on the spatial light modulator 70, and the minus sign is introduced before the x-component because the phase-modulated signal 76 propagates in the opposite direction after reflection.

The phase-modulated signal 76 is transmitted back through the half-wave plate 72, which yields:

$$E_{W2} = \frac{1}{\sqrt{2}} \begin{bmatrix} \cos(-2\alpha) & \sin(-2\alpha) \\ \sin(-2\alpha) & -\cos(-2\alpha) \end{bmatrix} \quad (18)$$

$$E_{SLM} = -\frac{1}{2} \begin{bmatrix} -1 & 1 \\ 1 & 1 \end{bmatrix} \begin{bmatrix} -1 \\ e^{i\theta(y_M)} \end{bmatrix} = -\frac{1}{2} \begin{bmatrix} 1 + e^{i\theta(y_M)} \\ -1 + e^{i\theta(y_M)} \end{bmatrix},$$

where $E_{W2}$ is the normalized electric field amplitude of the signal 78 transmitted by the half-wave plate 72. The optical splitter 60 receives this signal 78 and reflects its s-polarized component (i.e., its y-component) toward the first detector unit 64a as a modulated return signal 50. The electric field amplitude $E_{MRS}$ of the modulated return signal 50 detected by the first detector unit 64a is proportional to:

$$E_{MRS} = \frac{1}{2}[-1 + e^{i\theta(y_M)}] = \sin\left[\frac{\theta(y_M)}{2}\right] \exp\left\{\frac{i}{2}[\theta(y_M) + \pi]\right\}. \quad (19)$$

In some implementations, by varying the phase-shift function $\theta(y_M)$ introduced by the spatial light modulator 70 between 0 and π, the amplitude $E_{MRS}$ of the modulated return signal 50 will be spatially modulated in amplitude between 0 and 1 as a function of $y_M$. It will be understood that the embodiment of FIG. 8 can achieve spatial amplitude modulation of the first return signal component 62a by the combination of the spatial phase modulation imparted by the spatial light modulator 70 and the polarization-dependent phase retardation imparted by the half-wave plate 72. The processing unit 66 can then generate a first modulated 2D SA image $S_1(x, R)$ from the return signal data associated with the modulated return signal 50. It is to be noted that the term $\exp\{(i[\theta(y_M)+\pi]/2\}$ introduces a constant phase delay for each target element of the target region 24 that otherwise does not affect $S_1(x, R)$.

As for the embodiment of FIG. 4, it is to be noted that the first modulated image $S_1(x, R)$ and the unmodulated image $S_0(x, R)$ are obtained in one of the two passes of the SA imaging system 20 of FIG. 8 over the target region 24. In the other pass, the phase-shift function $\theta(y_M)$ of the spatial light modulator 70 can be varied to obtain a second modulated 2D SA image $S_2(x, R)$ from the return signal data associated with the modulated return signal 50. Alternatively, a different spatial light modulator 70 can be used during the other pass. Following this other pass, a second modulated 2D SA image $S_2(x, R)$ can be generated from the return signal data associated with the modulated return signal 50. Then, the first modulated 2D SA image $S_1(x, R)$, the second modulated 2D SA image $S_2(x, R)$ and the unmodulated 2D SA image $S_0(x, R)$ can be combined to obtain a 3D SA image and elevation map of the target region 24, such as described above. Depending on the application, an unmodulated image can be generated in either one or both of the passes.

Figure 9:
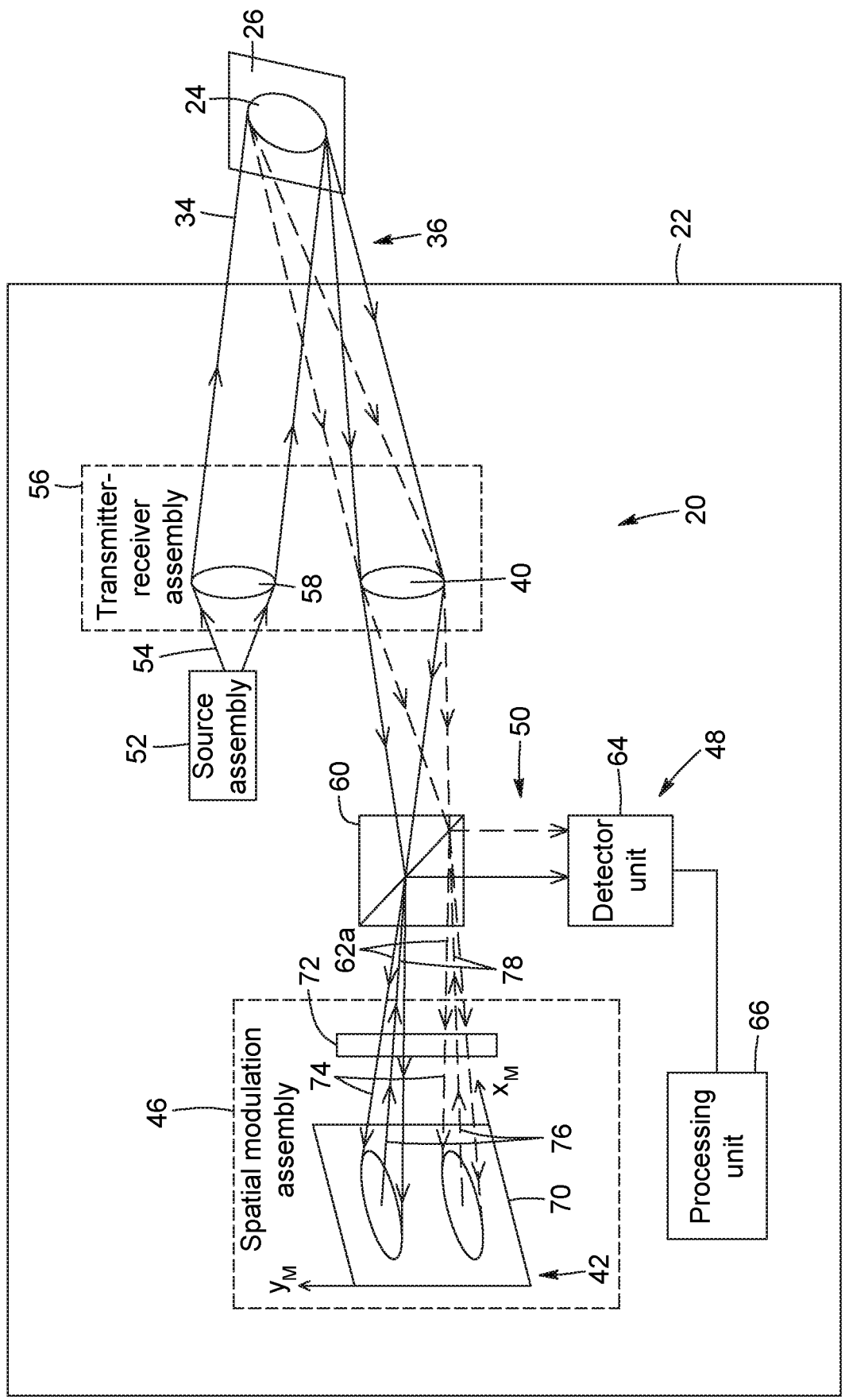
FIG. 9 is a block diagram of an exemplary embodiment of a three-pass SA imaging system having a spatial modulation assembly that includes a spatial light modulator.

Referring to FIG. 9, there is illustrated a further embodiment of an SA imaging system 20, in which the 2D SA images $S_0(x, R)$, $S_1(x, R)$ and $S_2(x, R)$ are obtained in a three-pass operation. The embodiment of FIG. 9 differs from that of FIG. 8 mainly in that the detector assembly 48 includes only one detector unit 64 that detects the SA return signal 36 after its round-trip passage through the spatial modulation assembly 46. It will be understood that, in this embodiment, the spatial light modulator 70 is adjusted to cause a spatially uniform phase shift, or no phase shift at all, during the acquisition of the unmodulated 2D SA image $S_0(x, R)$.

Figure 10:
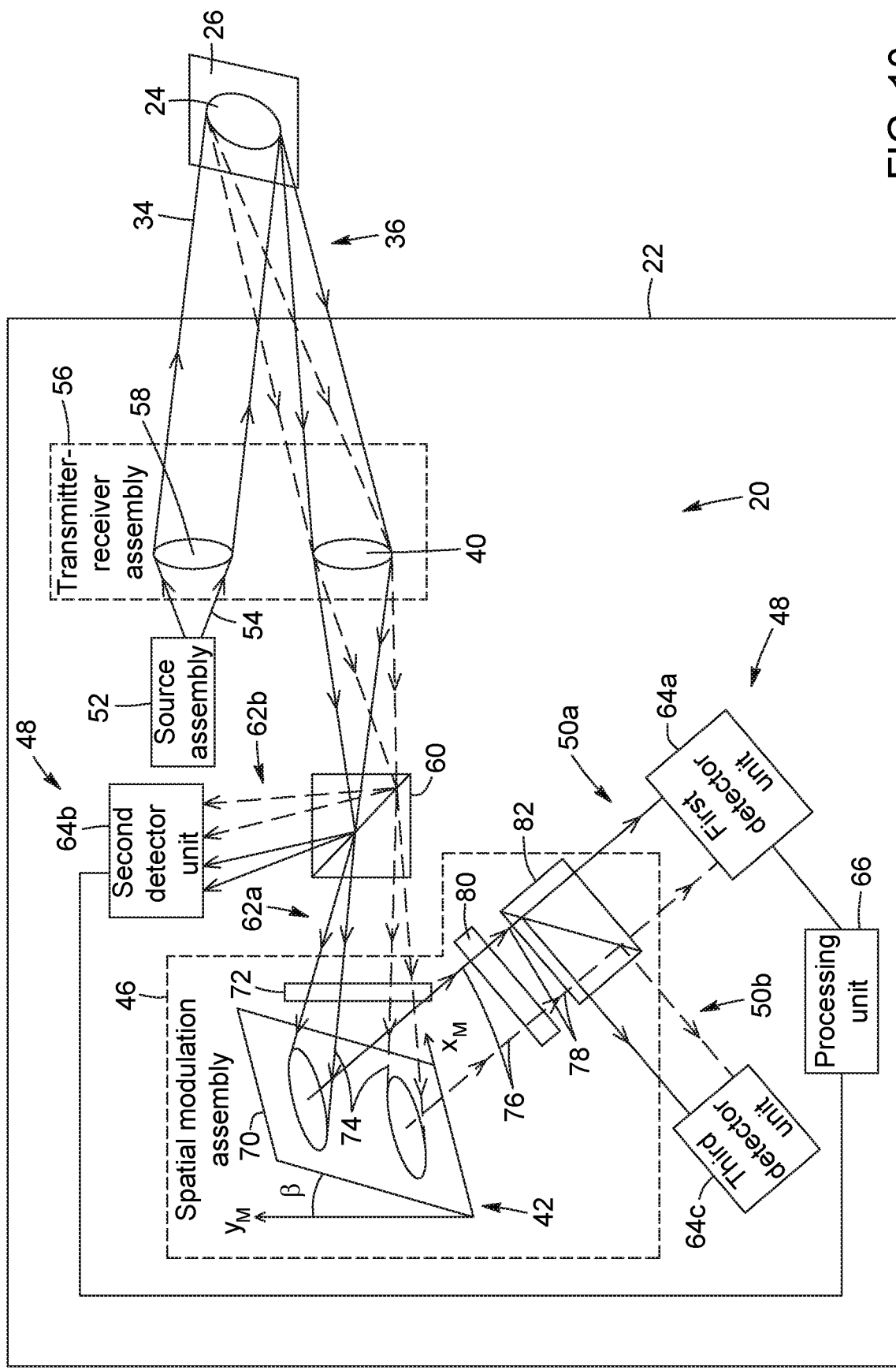
FIG. 10 is a block diagram of an exemplary embodiment of a one-pass SA imaging system having a spatial modulation assembly that includes a spatial light modulator.

Referring to FIG. 10, there is illustrated yet another embodiment of an SA imaging system 20. The embodiment of FIG. 10 is a one-pass variant of the embodiment of FIG. 8 and differs from that embodiment mainly in that the spatial light modulator 70 is oriented such that the signal 76 reflected by the spatial light modulator 70 passes through a different half-wave plate 80 and is split by a different polarizing beam splitter 82. The polarizing beam splitter 82 is configured to split the signal 84 transmitted by the half-wave plate 80 into a first modulated return signal 50a and a second modulated return signal 50b which is orthogonally polarized to the first modulated return signal 50a. The first and second modulated return signal 50a, 50b are detected by respective detector units 64a, 64c. The first modulated 2D SA image $S_1(x, R)$ and the second modulated 2D SA image $S_2(x, R)$ can then be generated from the return signal data associated with the first and second modulated return signals 50a, 50b, respectively, as described above. Meanwhile, the unmodulated 2D SA image $S_0(x, R)$ can be generated as in FIG. 8. It is to be noted that in FIG. 10, the electric field amplitudes $E_{MRS,1}$ and $E_{MRS,2}$ of the first and second modulated return signals 50a, 50b can be expressed as:

$$E_{MRS,1} = \frac{1}{2}[1 + e^{i\theta(y_M)}] = \cos\left[\frac{\theta(y_M)}{2}\right]\exp\left[\frac{i}{2}\theta(y_M)\right], \quad (20)$$

$$E_{MRS,2} = \frac{1}{2}[-1 + e^{i\theta(y_M)}] = \sin\left[\frac{\theta(y_M)}{2}\right]\exp\left\{\frac{i}{2}[\theta(y_M) + \pi]\right\}. \quad (21)$$

As described above, the first modulated 2D SA image $S_1(x, R)$, the second modulated 2D SA image $S_2(x, R)$ and the unmodulated 2D SA image $S_0(x, R)$ can be combined to obtain a 3D SA image and elevation map of the target region 24.

Of course, numerous modifications could be made to the embodiments described above without departing from the scope of the appended claims.

The invention claimed is:

1. A method for synthetic aperture (SA) imaging of a target region from a platform in relative movement with respect to the target region along a travel path, the method comprising:
   illuminating the target region with at least one SA transmission signal transmitted from the platform, and collecting, on the platform, at least one respective SA return signal having a return angle distribution and produced by reflection of the at least one SA transmission signal from the target region;
   applying a first spatial modulation to a first return signal component of the at least one SA return signal as a function of the return angle distribution to produce a first modulated return signal, the first spatial modulation having a first modulation profile;
   detecting the first modulated return signal and generating therefrom a first modulated two-dimensional (2D) SA image of the target region;
   applying a second spatial modulation to a second return signal component of the at least one SA return signal as a function of the return angle distribution to produce a second modulated return signal, the second spatial modulation having a second modulation profile different from the first modulation profile;
   detecting the second modulated return signal and generating therefrom a second modulated 2D SA image of the target region; and
   combining the first modulated 2D SA image and the second modulated 2D SA image to obtain a three-dimensional (3D) SA image of the target region.

2. The method of claim 1, further comprising:
   obtaining a third return signal component from the at least one SA return signal;
   detecting the third return signal component and generating therefrom an unmodulated 2D SA image of the target region; and
   combining the unmodulated 2D SA image with the first and second modulated 2D SA images to obtain the 3D SA image.

3. The method of claim 1, further comprising determining an elevation map of the target region from the 3D SA image thereof.

4. The method of claim 1, wherein the first modulation profile is a first sinusoidal function and the second modulation profile is a second sinusoidal function shifted by a quarter period relative to the first sinusoidal function.

5. The method of claim 1, wherein applying the first spatial modulation and the second spatial modulation comprises applying the first spatial modulation and the second spatial modulation in a transmission configuration.

6. The method of claim 1, wherein applying the first spatial modulation and the second spatial modulation comprises applying the first spatial modulation and the second spatial modulation in a reflection configuration.

7. The method of claim 1, wherein applying the first spatial modulation and the second spatial modulation comprises applying the first spatial modulation and the second spatial modulation along a modulation axis that is perpendicular to the travel path.

8. The method of claim 1, wherein generating the first modulated 2D SA image and the second modulated 2D SA image comprises generating the first modulated 2D SA image and the second modulated 2D SA image in one pass of the platform over the target region.

9. The method of claim 1, where generating the first modulated 2D SA image and the second modulated 2D SA image comprises generating the first modulated 2D SA image and the second modulated 2D SA image in two passes of the platform over the target region.

10. The method of claim 1, wherein combining the first modulated 2D SA image and the second modulated 2D SA image to obtain the 3D SA image comprises:
    generating a phase-wrapped image of the target region from the first modulated 2D SA image and the second modulated 2D SA image; and
    unwrapping the phase-wrapped image to obtain the 3D SA image.

11. The method of claim 10, further comprising a step of removing a flat Earth phase difference from the phase-wrapped image prior to unwrapping the phase-wrapped image.

12. A system for synthetic aperture (SA) imaging of a target region from a platform in relative movement with respect to the target region along a travel path, the system comprising:
    a transmitter-receiver assembly mounted on the platform and comprising:

an SA transmitter configured to illuminate the target region with at least one SA transmission signal during at least one pass of the platform over the target region; and an SA receiver configured to collect at least one respective SA return signal having a return angle distribution and produced by reflection of the at least one SA transmission signal from the target region;

a spatial modulation assembly mounted on the platform and configured to apply a first spatial modulation to a first return signal component of the at least one SA return signal as a function of the return angle distribution to produce a first modulated return signal, the first spatial modulation having a first modulation profile, the spatial modulation assembly being configured to apply a second spatial modulation to a second return signal component of the at least one SA return signal as a function of the return angle distribution to produce a second modulated return signal, the second spatial modulation having a second modulation profile different from the first modulation profile;

a detector assembly mounted on the platform and configured to detect the first modulated return signal and the second modulated return signal; and a processing unit coupled to the detector assembly and configured to generate a first modulated two-dimensional (2D) SA image and a second modulated 2D SA image of the target region respectively from the first modulated return signal and the second modulated return signal, and combine the first modulated 2D SA image and the second modulated 2D SA image to obtain a three-dimensional (3D) SA image of the target region.

13. The system of claim 12, further comprising an optical splitter configured to obtain a third return signal component from the at least one SA return signal, wherein the detector assembly is configured to detect the third return signal component, and wherein the processing unit is configured to generate an unmodulated 2D SA image of the target region from the third return signal component and to combine the unmodulated 2D SA image with the first and second modulated 2D SA images to obtain the 3D SA image.

14. The system of claim 12, wherein the processing unit is further configured to determine an elevation map of the target region from the 3D SA image thereof.

15. The system of claim 12, wherein the first modulation profile is a first sinusoidal function and the second modulation profile is a second sinusoidal function shifted by a quarter period relative to the first sinusoidal function.

16. The system of claim 12, wherein the spatial modulation assembly is configured to apply the first spatial modulation and the second spatial modulation in a transmission configuration.

17. The system of claim 12, wherein the spatial modulation assembly is configured to apply the first spatial modulation and the second spatial modulation in a reflection configuration.

18. The system of claim 12, wherein the spatial modulation assembly is configured to apply the first spatial modulation and the second spatial modulation along a modulation axis that is perpendicular to the travel path.

19. The system of claim 18, wherein the modulation axis lies in a back focal plane of the SA receiver.

20. The system of claim 12, wherein the at least one SA transmission signal has a center frequency ranging from 30 terahertz to 300 terahertz.

* * * * *